United States Patent

Kubo

[11] Patent Number: 5,590,115
[45] Date of Patent: Dec. 31, 1996

[54] OPTICAL DISK AND APPARATUS FOR MANUFACTURING THE SAME

[75] Inventor: Toyohide Kubo, Tokushima, Japan

[73] Assignee: Awa Engineering Co., Ltd., Tokushima, Japan

[21] Appl. No.: 521,023

[22] Filed: Aug. 29, 1995

Related U.S. Application Data

[63] Continuation of Ser. No. 78,051, Jun. 18, 1993, abandoned.

[30] Foreign Application Priority Data

Jun. 22, 1992 [JP] Japan ................................ 4-188663

[51] Int. Cl.$^6$ ........................................... G11B 7/24
[52] U.S. Cl. ................................ 369/290; 369/282
[58] Field of Search ........................ 369/290, 289, 369/272, 292, 282; 360/135

[56] References Cited

U.S. PATENT DOCUMENTS

| | | | |
|---|---|---|---|
| 4,787,009 | 11/1988 | Takahashi | 369/290 |
| 4,885,653 | 12/1989 | Kato | 369/290 |
| 5,057,960 | 10/1991 | Shiba et al. | 369/290 |
| 5,323,381 | 6/1994 | Takahashi et al. | 369/290 |

*Primary Examiner*—Robert S. Tupper
*Assistant Examiner*—Paul J. Ditmyer
*Attorney, Agent, or Firm*—Wenderoth, Lind & Ponack

[57] ABSTRACT

In an optical disk according to the present invention, a part of a disk is heat pressed to thereby connect a clamping plate to the central part of the disk. The heat pressed part of the optical disk is heat pressed into a discontinuous form during connection of the clamping plate to the disk. An apparatus for manufacturing such an optical disk connects the clamping plate to the disk by heat pressing a part of the disk onto which the clamping plate is mounted. This is carried out by a pressing surface of a heat press member. The heat press member is provided in its annular pressing surface with radially elongated grooves, so as to divide the annular pressing surface into a plurality of portions by the grooves.

20 Claims, 7 Drawing Sheets

OPTICAL DISK AND APPARATUS FOR MANUFACTURING THE SAME

This application is a Continuation of now abandoned application Ser. No. 08/078,051, filed on Jun. 18, 1993.

BACKGROUND OF THE INVENTION

1. Field of the Invention

The present invention relates to an optical disk and an apparatus for manufacturing the same. The term "optical disk" in this specification is intended to encompass a wide range of optical disks including an optical magnetic disk.

2. Description of the Prior Art

An optical disk has a clamping plate connected to the center of the same. The clamping plate is provided for rotating the optical disk and comprises a metal plate pressed into the shape of a disk. The clamping plate is connected to the center of the optical disk. In a MD(mini-disk), a clamping plate is not fixed to a disk but is connected to the disk with play therebetween. It is important that the clamping plate is connected precisely to the center of the disk. It is especially necessary that in a MD, the clamping plate is connected to the center of a disk with a precise clearance between the clamping plate and the disk. If the clearance is not precise, the connecting positions of the clamping plate and the disk cannot coincide with each other. The recording density of an optical disk is so high that the track pitch thereof is 1.6 μm and the maximum line density is 0.6 μm, and such an optical disk is required to be processed with high precision.

As shown in FIG. 1, a clamping plate 2 is connected to a disk 1 by crushing a part of, the disk. A heat press member 5 such as an ultrasonic horn or a heating horn is used for crushing a part of the disk 1. The lower end portion of the heat press member 5 has a cylindrical shape. The cylindrical lower end portion of the heat press member 5 is so formed as to heat press and deform the part of the disk 1 into an annular shape along the outer circumference of the clamping plate 2.

An optical disk is manufactured in the following manner.
① A disk 1 is set horizontally on a press stand.
② A clamping plate 2 is set at the center of the disk 1. The disk 1 may be set on the press stand after the clamping plate 2 is mounted on the disk 1.
③ By means of the heat press member 5, a part of the disk 1 is heat pressed into an annular shape along the outer circumference of the clamping plate 2. The heat pressed part of the disk 1 is inwardly projected as shown with broken lines in FIG. 1, so that the clamping plate 2 is connected to the disk 1.

Optical disks manufactured in the above-mentioned method are advantageous in that they can be manufactured on a large scale and at low cost. This is because, in this method, the clamping plate can be connected to the disk by pressing a part of the disk and without using an adhesive agent, an adhesive tape or the like. However, an optical disk manufactured in such a method has a defect in that it is hard to heat press and deform the care of the disk into a precise annular shape so as to connect the clamping plate to the disk. The heat pressed part heated by the heat press member may thus have a projection such as shown by B in FIG. 2 on its inner periphery. The projection B will sometimes separate from the disk while the optical disk is used. A broken piece separated from the disk is apt to enter into a clearance between a reading head and the optical disk and cause a bit error. Further, such a broken piece will sometimes scratch the surface of the optical disk and thereby cause critical damage to the optical disk. Furthermore, a projection projected inwardly from the heat pressed part causes a reduction in the precision of the connection of the clamping plate with the disk. If the projection is in contact with the clamping plate, the clamping plate will not be uniformly connected to the disk.

The projection B is produced on the inside of the heat pressed part of the disk because the inner diameter of the heat pressed part is reduced through the heat pressing process. In other words, the part of the disk pressed by the heat press member is caused to protrude inwardly and is so deformed as to prevent the clamping plate from being removed. The inwardly protruded plastic part has a reduced inner diameter, and a force acts to radially urge the plastic material of the inner circumferential portion of the heat pressed part. This force causes partially protrusion of the plastics and thereby produces a projection.

A projection produced on the inside of the heat pressed part of the disk can be reduced by horizontally setting the disk on the press stand with high precision and precisely clamping the disk between the heat press member and the press stand. However, it is very difficult in practice to press with high precision each of the disks which are continuously fed one by one. It is especially difficult to control the feed position of each disk with high precision when the manufacturing efficiency is raised by reducing the tact time.

The present invention has been developed in order to solve the above-mentioned defects of the prior art. An important object of the present invention is to provide an optical disk for which the production of projection on the inside of the heat pressed part of the disk is reduced, the occurrence of bit errors caused by the projections is decreased and critical damage of the optical disk surface can be prevented. Another important object is provide an apparatus for manufacturing the optical disk.

The above and further objects and features of the present invention will more fully be apparent from the following detailed description with reference to the accompanying drawings.

SUMMARY OF THE INVENTION

An optical disk according to the present invention has such a construction that a central part of the plastic disk around the outer circumference of a clamping plate is heat pressed and deformed into an annular shape and thereby the clamping plate is connected to the center of the disk. Further, in an optical disk according to the present invention, the heat pressed part of the disk is heat pressed into a discontinuous form so as to connect the clamping plate to the disk.

Further, an apparatus for manufacturing an optical disk according to the present invention comprises a press stand on which a plastic disk is to be set, and a heat press member for heat pressing the central part of the disk which is set on the press stand and on which a clamping plate is mounted at the center thereof, and thereby connecting the clamping plate to the disk.

Furthermore, in an apparatus for manufacturing an optical disk according to the present invention, grooves are provided in the radial direction in the pressing surface of the heat press member which is constructed to press the disk.

By an apparatus for manufacturing an optical disk having the above mentioned construction, a clamping plate is connected to the center of a disk in the following manner.

① A disk on which a clamping plate is mounted at the center thereof is set on the press stand.

② The heat press member is urged onto the disk. A part of the disk around the clamping plate is heat pressed, and the heat pressed part of the disk is crushed. The crushed plastic material of the heat pressed part of the disk is protruded inwardly and the heat pressed part of the disk has a reduced inner diameter. With this heat pressed part having the reduced inner diameter, the clamping plate is connected to the disk so that it cannot be removed. The heat press member has grooves in the pressing surface thereof which is constructed to press the disk. The heat pressed part of the disk pressed by the pressing surface having such grooves is not deformed into an annular shape but is crushed into discontinuous segments. In the discontinued heat pressed part of the disk, warp is not locally concentrated even if the inner diameter of the heat pressed part is reduced. Therefore, unlike a conventional optical disk, an optical disk according to the present invention has no projection on the inside of the heat pressed part of the disk, and therefore can connect the clamping plate to the disk through a uniform width with high precision.

DETAILED DESCRIPTION OF THE INVENTION

Figure 1:
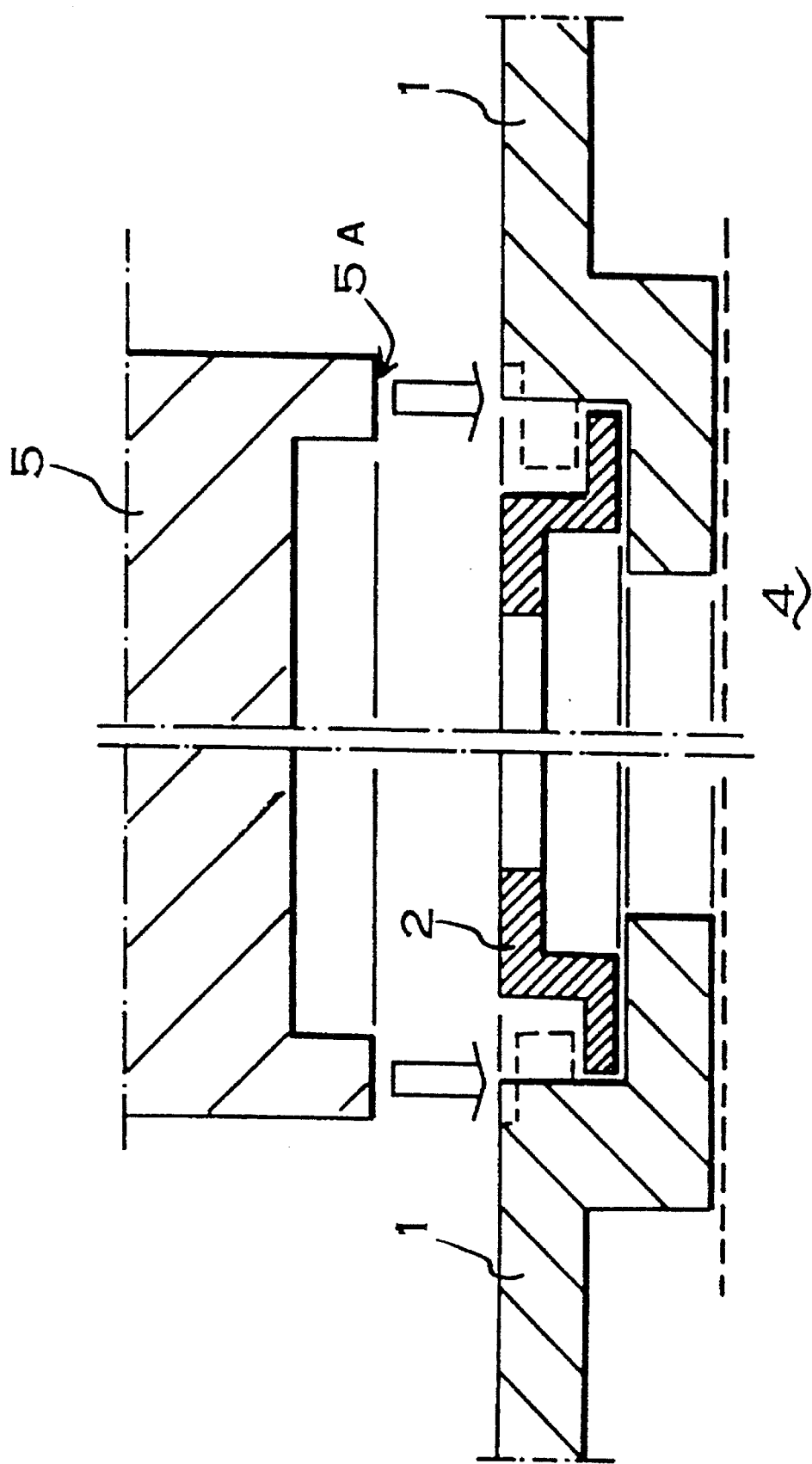
FIG. 1 is a sectional view illustrating conventional process for connecting a clamping plate to the center of a disk.
Figure 2:
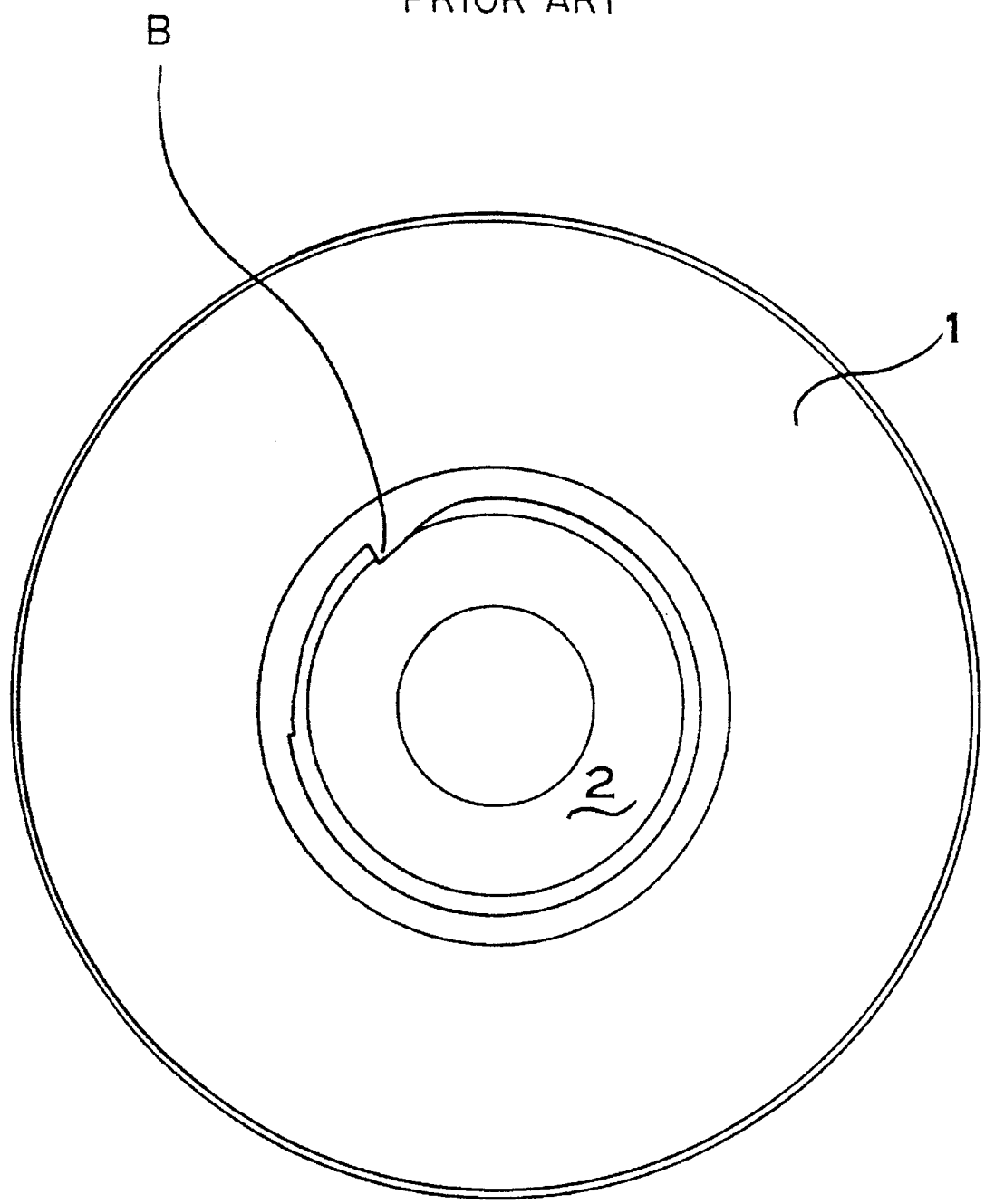
FIG. 2 is a plan view showing a conventional optical disk in which a clamping plate is connected to a disk.
Figure 3:
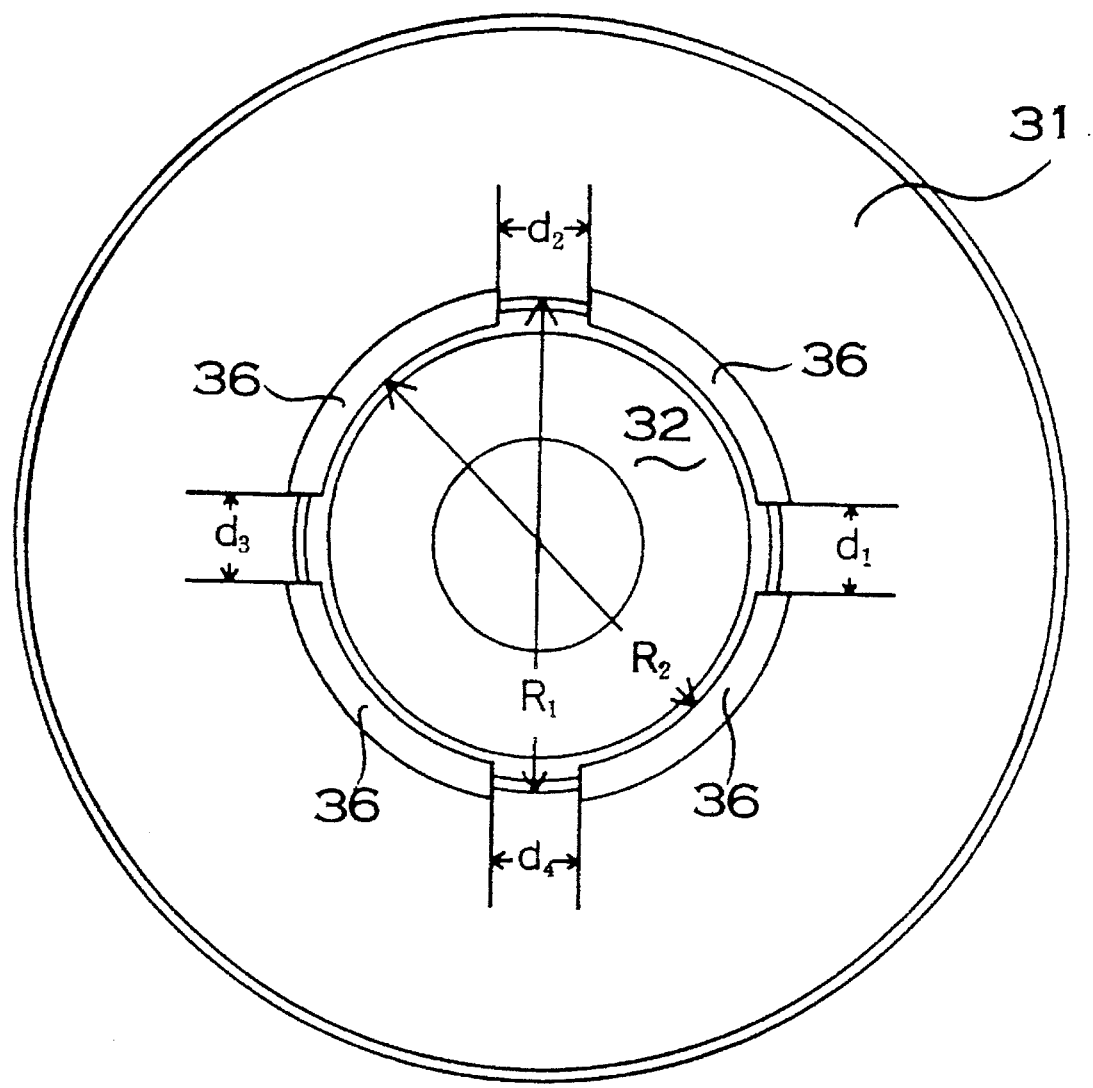
FIG. 3 is a plan view showing an optical disk of an embodiment of the present invention.

In an optical disk shown in FIG. 3, a clamping plate 32 is connected to the center of the disk 31. The disk 31 is made of plastic material deformable by heating. A part of the disk 31 near the outer circumferential periphery of the clamping plate 32 is heat pressed and crushed so as to connect the clamping plate 32 to the disk 31. The heat pressed part 36 connecting the clamping plate 32 to the disk 31 has a discontinuous annular shape with gaps at four positions, such that the heat-pressed part 36 constitutes four elongated portions. The discontinued portions (i.e. the gaps) absorb the difference between the inner circumference of the disk 31 and the reduced inner circumference of the heat pressed part 36 during the heat pressing process. Therefore, the sum of the discontinued portions $d_1+d_2+d_3+ \ldots d_n$ of the heat pressed part 36 is designed preferably larger than $\pi(R_1-R_2)$. This is because the difference between the inner circumferences of the disk 31 and the heat pressed part 36 is $\pi(R_1-R_2)$, in which $R_1$ indicates the inner diameter of the disk 31 and $R_2$ indicates the inner diameter of the heat pressed part 36.

Figure 4:
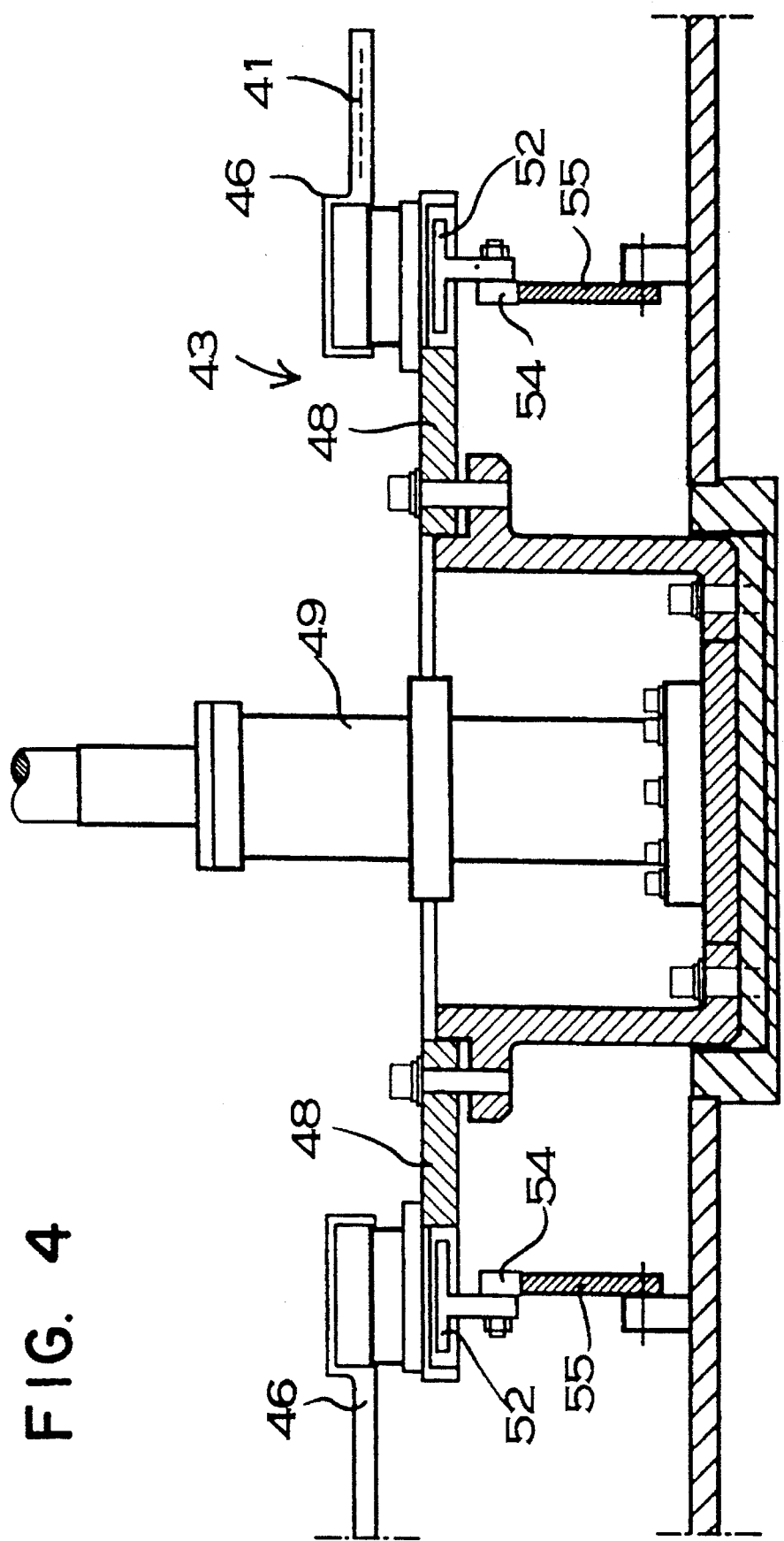
FIG. 4 is a vertical sectional view showing an apparatus for manufacturing an optical disk of an embodiment of the present invention.
Figure 5:
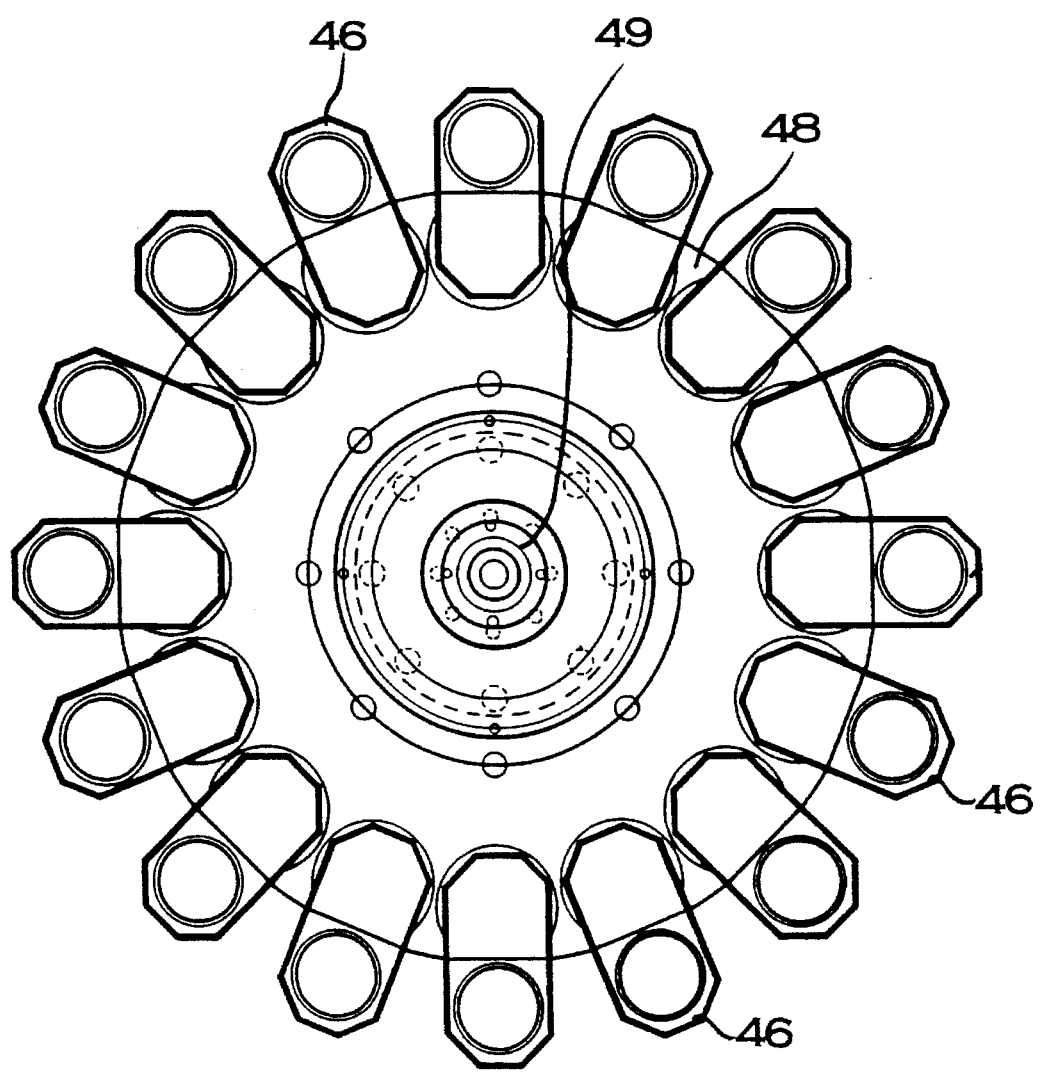
FIG. 5 is a plan view showing a feeding means of the apparatus for manufacturing an optical disk shown in FIG. 4.
Figure 6:
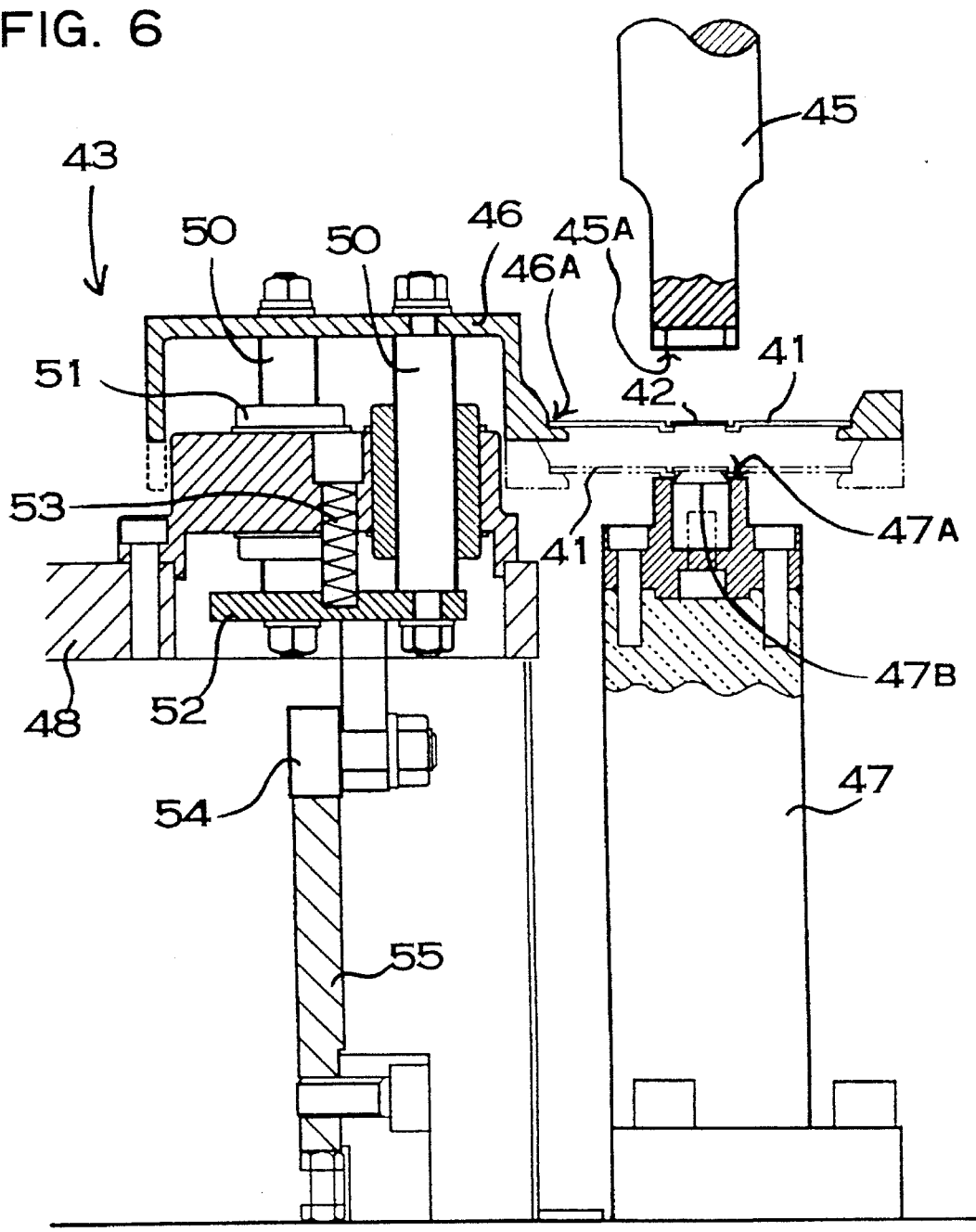
FIG. 6 is a sectional view showing a part near a vertically movable mount of the apparatus for manufacturing an optical disk shown in FIG. 4.

An optical disk is manufactured by an apparatus shown in FIGS. 4 to 6. The apparatus for manufacturing the optical disk shown in FIGS. 4 to 6 comprises a feeding means 43 for feeding the plastic disk 41, a press stand 47 on which the disk 41 fed by the feeding means 43 is set and a heat press member 45 for heat pressing the central part of the disk 41 which is set on the press stand 47 and on which a clamping plate 42 is mounted at the center thereof and thereby connecting the clamping plate 42 to the disk 41.

The feeding means 43 comprises a vertically movable mounts 46, a feeding member 48 to which vertically movable mounts 46 are vertically movably connected, and a vertically moving mechanism for vertically moving the vertically movable mounts 46 and thereby setting the disk 41 on the press stand 47. FIG. 5 is a plan view of the feeding means 43. FIG. 4 is a vertical sectional view of the feeding means 43, and FIG. 6 is a sectional view showing a part of the apparatus near the vertically movable mounts 46. In the feeding means 43 shown in these drawings, the feeding member 48 has a disk-like shape and the uniformly spaced vertically movable mounts 46 are connected to the outer circumferential periphery of the feeding member 48 so as to be vertically movable. In the feeding member 48 shown in FIG. 5, sixteen sets of uniformly spaced vertically movable mounts 46 are connected. At the center of the disk-like feeding member 48, a rotary shaft 49 is fixed. The rotary shaft 49 is vertically supported to be rotatable by means of a bearing. A servomotor, though not shown, is connected to the rotary shaft 49. The servomotor incrementally rotates the rotary shaft 49 through angles of 360°/16, and thereby moves each of the vertically movable mounts 46 into position right above the press stand 47 one by one.

The manner in which the vertically movable mounts 46 are connected by the feeding member 48 is shown in FIG. 6. The vertically movable mount 46 shown in FIG. 6 is vertically movably connected through guide rods 50 and a direct acting bearing 51 to the feeding member 48. The direct acting bearing 51 is vertically fixed to the feeding member 48. The guide rods 50 movably penetrating the direct acting bearing 51 are vertically fixed to the left side lower surface of the vertically movable mount 46. A plural number of guide rods 50 are fixed to the vertically movable mount 46 so as to prevent the vertically movable mount 46 from rotating. Each of guide rods 50 is connected through one of the direct acting bearings 51 to the feeding member 48. The lower end of each of the guide rods 50 is fixed to a connecting plate 52.

The vertically movable mount 46 is vertically displaced by the vertically moving mechanism. The vertically moving mechanism comprises a spring 53 for resiliently downwardly urging the vertically movable mount 46, a wheel 54 connected to the vertically movable mount 46, and a cylindrical cam 55 for upwardly urging the wheel 54. For downwardly urging the connecting plate 52 of the vertically movable mount 46, the spring 53 is provided between a base to which the direct acting bearing 51 is fixed and the connecting plate 52. The wheel 54 is connected through a connecting member projected from the lower surface of the connecting plate 52. The cylindrical cam 55 is provided in the locus of the movement of the wheel 54. In this vertical moving mechanism, when the feeding member 48 is rotated, the wheel moves along the cylindrical cam 55. Therefore, by changing the position of the high point of the cylindrical cam 55, the vertically movable amount 46 can be moved upwardly and downwardly. By moving down the cylindrical cam 55, the vertically movable mount 46 is moved down;

and by moving up the cylindrical cam 55, the vertically movable mount 46 is moved up. The vertically movable mount 46 is constructed to mount the disk 41 onto the press stand 47 when the vertically movable mount 46 is right above the press stand 47. Therefore, the cylindrical cam 55 is constructed to downwardly move the vertically movable mount 46 at the position right above the press stand 47 and to upwardly move the vertically movable mount 46 at the other positions. When the vertically movable mount 46 moves down, the disk 41 mounted on the vertically movable mount 46 is separated from the vertically movable mount 46 and placed onto the press stand 47. When the disk to which the clamping plate has been connected is raised from the press stand by means of the vertically movable mount, it is preferable to vertically upwardly move the vertically movable mount without rotating the feeding member. This is because, when the vertically movable mount is moving vertically upward, it can more precisely maintain the position of the disk than when it is moving obliquely upwardly. In order to realize this, a part of the cylindrical cam is separated from the remaining part and is constructed to be vertically movable. This vertically movable part is connected to a cylinder (not shown), and the cylinder is fixed vertically to a frame with one end of a rod being connected to the lower surface of the vertically movable part of the cylindrical cam. Though not shown, the vertically movable part of the cylindrical cam is so connected to the frame as to be vertically movable by means of a mechanism which does not make pivotal movement in a horizontal plane.

In FIG. 6, a support part 46A for supporting the periphery of the disk 41 is provided on the right side of the vertically movable mount 46. The support part 46 is a step-shaped part for supporting the periphery of the disk 41. The upper side of the step-shaped part is opened so as to form a circle having a somewhat larger diameter than that of the disk 41 while the lower side of the step-shaped part is opened so as to form a circle having a somewhat smaller diameter than that of the disk 41. The vertically movable mount 46 having such a construction transfers the disk 41 mounted on the circular part having a smaller diameter than that of the disk 41.

The press stand 47 is fixed vertically to a base in the position corresponding to the center of the disk 41 transferred to the position where the clamping plate is connected to the disk. At the upper end of the press stand 47, a cylindrical receiving surface 47A is provided for supporting the central part of the disk 41, namely, the lower surface of the part of the disk to which the clamping plate is welded. The cylindrical receiving surface 47A is planar and has a width capable of supporting the connecting part of the disk 41. At the center of the cylindrical receiving surface 47A, a guide cone 47B is provided which is to be inserted into the central opening of the disk 41. The guide cone 47B is inserted into the central opening of the disk 41 whereby the disk 41 is precisely positioned at the center of the press stand 47. For this purpose, the guide cone 47B is upwardly tapered and has an outer diameter substantially equal to the diameter of the central opening of the disk 41. The guide cone 47B is designed to have a height such that it will not upwardly urge the clamping plate 42 when the guide cone 47B is set in the central opening of the disk 41.

Figure 7:
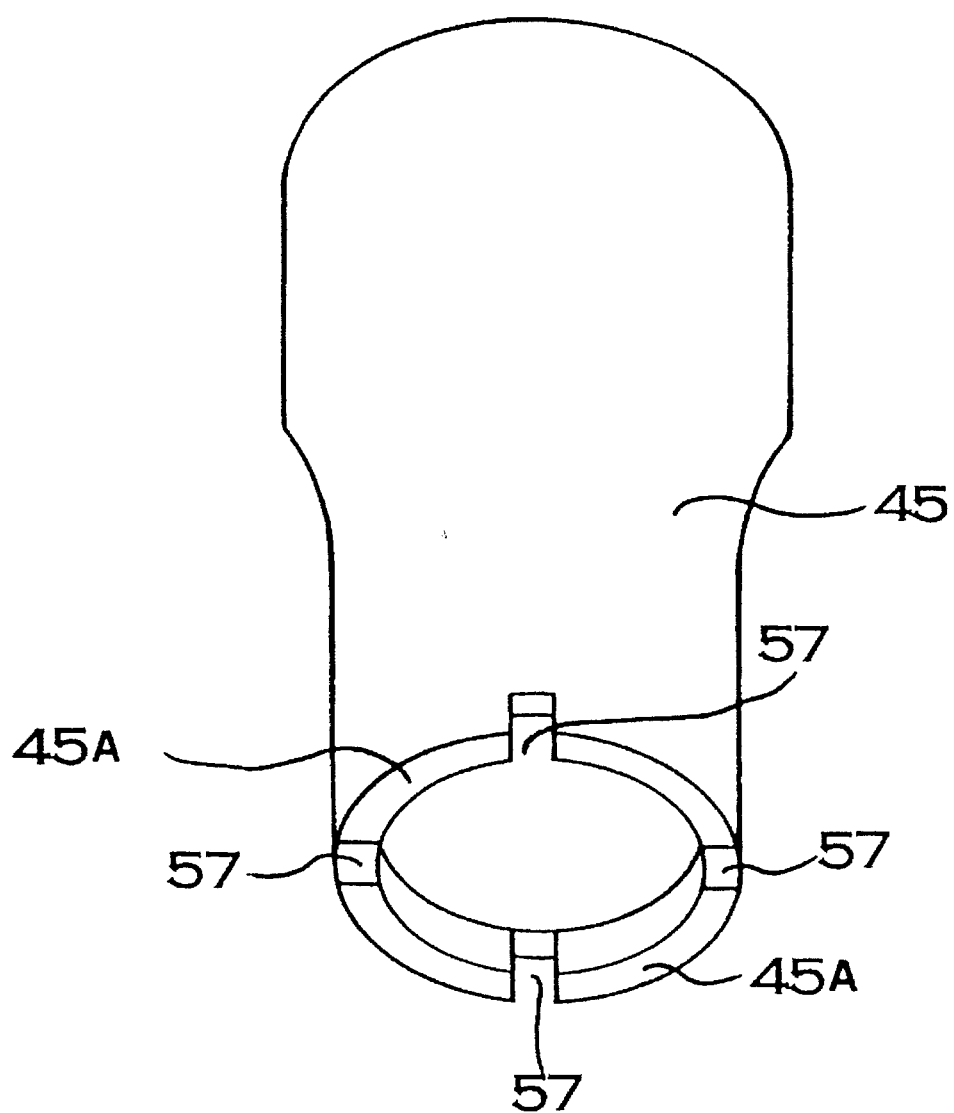
FIG. 7 is a perspective view showing the lower end part of a heat press member of the apparatus for manufacturing an optical disk shown in FIG. 6.

The heat press member 45 is constructed to vibrate the thermoplastic disk 41 with ultrasonic waves and thereby connect the clamping plate 42 to the disk 41. Therefore the heat press member 45 is an ultrasonic horn. As shown in FIGS. 6 and 7, the heat press member comprising an ultrasonic horn has a cylindrical lower end part, and four radially elongated grooves 57 are provided in the cylindrical lower end part. The pressing surface 45A at the lower end of the heat press member 45 is divided into four discontinuous portions by the four grooves 5. As shown in FIGS. 5 and 6, the pressing surface 45A of the heat press member 45 presses and vibrates with ultrasonic waves a central part of the disk 1 near the outer circumferential periphery of the clamping plate 2. The heat pressed plastic material of the disk 1 is crushed into a shape shown with the broken line in FIG. 5, and thereby the clamping plate 2 is connected to the disk 1. In order to connect the clamping plate 2 to the disk 1, the heat press member may heat the disk 1 with a heater, instead of ultrasonic waves, to crush the part of the disk 1. The heat press member 45 moves down toward the disk 41 set on the press stand 47 and then connects the clamping plate 2 to the disk 1. Therefore, though not shown, the heat press member 45 is connected through a vertically movable mechanism to the base.

The apparatus for manufacturing an optical disk according to the present invention connects the clamping plate to the disk in the following method.

① The disk 41 is set on the support part 46A of the vertically movable mount 46 and the clamping plate 42 is mounted on the central part of the disk 41. At this time, the rotation of the feeding member 48 is stopped.

② The feeding member 48 is rotated, and thereby the disk 41 is transferred to the position right above the press stand 47, and then stopped.

③ When the disk 41 is transferred to the position right above the press stand 47, the wheel 54 of the vertically movable mount 46 moves to the position above the vertically movable part of the cylindrical cam 55. In this state, the vertically movable part of the cylindrical cam 55 is downwardly moved by the cylinder. The vertically movable mount moves down to the position shown with a two dot chain line, and the disk 1 is fed in the horizontal state onto the press stand 47.

④ The heat press member is downwardly moved, and the clamping plate 42 is connected to the disk 41.

⑤ Then, the heat press member is moved up.

⑥ Then, the vertically movable part of the cam 55 is moved up by the cylinder and the vertically movable mount 46 is moved up to the position shown with a full line in FIG. 6. Then, the feeding member 48 is rotated through an angle of 360°/16, and the disk 41 is discharged away from the position right above the press stand 47 and the next disk 41 is transferred to the position right above the press stand 47.

After that, the steps from ③ to ⑥ are repeated, and another clamping plate 42 is connected to another disk 41. At this time, the disk 41 to which the clamping plate has been connected is discharged from the vertically movable mount 46, and a new disk 41 to which a clamping plate 42 has not been connected yet is fed onto the vertically movable mount 46. An optical disk in which the heat pressed part of the disk connecting the clamping plate has a discontinuous annular shape as above-mentioned can effectively prevent projections from being produced on the inner peripheral part of the heat pressed part when the plastic disk is crushed. This is because the heat pressed part divided into a plural number of segments is shorter in total length than a continuous one. Since the heat pressed part is shorter, the shrinking amount of the plastic material in the circumferential direction caused by the inner diameter becoming smaller can be reduced. Therefore, it is advantageous that projections formed of inwardly protruded plastic material caused by the shrinking of the inner diameter of the heat pressed part of the disk can be effectively prevented.

Further, in an apparatus for manufacturing an optical disk in which radially elongated grooves are provided in the pressing surface of the heat press member constructed to press the disk, the disk is not pressed at the portions corresponding to the grooves of the heat press member. When the disk is pressed by the heat press member of such a construction, a discontinuous heat pressed part with gaps at the groove portions can be obtained. Therefore, an apparatus for manufacturing an optical disk having such a construction can connect a clamping plate to a disk with high precision and such that stray plastic pieces are not produced, by merely reforming the heat press member into a simple construction. Therefore, an optical disk manufactured by this apparatus has such advantages, that it can reduce the occurrence of bit error and thereby can improve its reliability, and that damage caused to the optical disk during use by extraneous substances can be extremely reduced.

As this invention may be embodied in several forms without departing from the spirit of the essential characteristics thereof, the present embodiment is therefore illustrative and not restrictive, since the scope of the invention is defined by the appended claims rather than by the description preceding them. Thus, all changes that fall within meets and bounds of the claims, or equivalents of such meets and bounds thereof are therefore intended to be embraced by the claims.

What is claimed is:

1. An optical disk comprising:

a plastic disk having a central plate-receiving part;

a clamping plate mounted in said central plate-receiving part of said plastic disk and retained in said central plate-receiving part of said plastic disk by a heat pressed and deformed portion of said plastic disk at a periphery of said central plate-receiving part of said plastic disk;

wherein said heat pressed and deformed portion of said plastic disk has been discontinuously heat pressed so as to form heat pressed segments with circumferentially spaced apart gaps therebetween and so as to connect said clamping plate to said plastic disk;

wherein said clamping plate includes a circular central part and an annular outer part surrounding said central part;

wherein a radial gap is formed between an inner peripheral edge of said discontinuously heat pressed and deformed portion of said plastic disk and a radially outwardly facing edge of said central part of said clamping plate;

wherein an annular gap is formed between said periphery of said central plate-receiving part of said plastic disk and a periphery of said annular part of said clamping plate, such that said clamping plate is radially movably disposed in said central plate-receiving part;

wherein said circumferentially spaced apart gaps between said projection segments constitute means for viewing, along an axial direction, segments of said annular gap at circumferentially spaced apart locations thereof; and wherein, when said clamping plate is concentric with said plate-receiving part, said heat pressed and deformed portion of said plastic disk does not contact said circular central part of said clamping plate.

2. An optical disk as recited in claim 1, wherein said heat pressed and deformed portion of said plastic disk is discontinuous at four locations about said periphery of said central plate-receiving part.

3. An optical disk as recited in claim 1, wherein said gaps have a combined length which is greater than $\pi(R_1-R_2)$, where $R_1$ is an inner diameter of a non-heat pressed and deformed portion of said periphery of said central plate-receiving part, and $R_2$ is an inner diameter of said heat pressed and deformed portion of said periphery of said central plate-receiving part.

4. An optical disk as recited in claim 1, wherein said heat pressed and deformed portion is present along substantially all of an outer circumferential periphery of said clamping plate.

5. An optical disk comprising:

a plastic disk having a central plate-receiving part;

a clamping plate mounted in said central plate-receiving part of said plastic disk;

wherein said plastic disk includes a discontinuous annular projection protruding inwardly from a periphery of said central plate-receiving part, said discontinuous annular projection overlying and retaining said clamping disk in said central plate-receiving part;

wherein said discontinuous annular projection is discontinuous at a plurality of circumferentially spaced apart locations so as to comprise a plurality of projection segments with circumferentially spaced apart gaps therebetween;

wherein said clamping plate includes a circular central part and an annular outer part surrounding said central part;

wherein radial gaps are respectively formed between inner peripheral edges of said projection segments and an outwardly facing edge of said central part of said clamping plate;

wherein an annular gap is formed between said periphery of said central plate-receiving part of said plastic disk and a periphery of said annular part of said clamping plate, such that said clamping plate is radially movable disposed in said central plate-receiving part;

wherein said circumferentially spaced apart gaps between said projection segments constitute means for viewing, along an axial direction, segments of said annular gap at circumferentially spaced apart locations thereof; and wherein, when said clamping plate is concentric with said plate-receiving part, said heat pressed and deformed portion of said plastic disk does not contact said circular central part of said clamping plate.

6. An optical disk as recited in claim 5, wherein said plastic disk further includes a main surface disposed outwardly of said central plate-receiving part;

said central plate-receiving part has a plate-receiving surface offset below said main surface of said plastic disk; and said clamping plate includes an outer peripheral portion which is interposed between said plate-receiving surface and said discontinuous annular projection.

7. An optical disk as recited in claim 6, wherein said gaps have a combined length which is greater than a difference in length between an outer circumference of said plate-receiving part and an inner circumference of said discontinuous annular projection.

8. An optical disk as recited in claim 5, wherein said discontinuous annular projection is discontinuous at four locations about said periphery of said central plate-receiving part.

9. An optical disk as recited in claim 5, wherein said gaps have a combined length which is greater than a difference in length between an outer circumference of said plate-receiving part and an inner circumference of said discontinuous annular projection.

10. An optical disk as recited in claim 5, wherein said discontinuous annular projection is present along substantially all of an outer circumferential periphery of said clamping plate.

11. An optical disk comprising:

a plastic disk having a central plate-receiving part;

a clamping plate mounted in said central plate-receiving part of said plastic disk and retained in said central plate-receiving part of said plastic disk by a heat pressed and deformed portion of said plastic disk at a periphery of said central plate-receiving part of said plastic disk;

wherein said heat pressed and deformed portion of said plastic disk has been discontinuously heat pressed so as to form heat pressed segments with circumferentially spaced apart gaps therebetween and so as to connect said clamping plate to said plastic disk;

wherein an outer peripheral edge of said clamping plate is circumferentially continuous about an entirety of the outer periphery of said clamping plate;

wherein an entirety of said outer peripheral edge of said clamping plate lies in a single plane;

wherein an annular gap is formed between said periphery of said central plate-receiving part of said plastic disk and a periphery of said annular part of said clamping plate, such that said clamping plate is radially movably disposed in said central plate-receiving part;

wherein said circumferentially spaced apart gaps between said projection segments constitute means for viewing, along an axial direction, segments of said annular gap at circumferentially spaced apart locations thereof; and wherein, when said clamping plate is concentric with said plate-receiving part, said heat pressed and deformed portion of said plastic disk does not contact said clamping plate.

12. An optical disk as recited in claim 11, wherein said heat pressed and deformed portion of said plastic disk is discontinuous at four locations about said periphery of said central plate-receiving part.

13. An optical disk as recited in claim 11, wherein said gaps have a combined length which is greater than $\pi(R_1-R_2)$, where $R_1$ is an inner diameter of a non-heat pressed and deformed portion of said periphery of said central plate-receiving part, and $R_2$ is an inner diameter of said heat pressed and deformed portion of said periphery of said central plate-receiving part.

14. An optical disk as recited in claim 11, wherein said heat pressed and deformed portion is present along substantially all of an outer circumferential periphery of said clamping plate.

15. An optical disk comprising:

a plastic disk having a central plate-receiving part;

a clamping plate mounted in said central plate-receiving part of said plastic disk;

wherein said plastic disk includes a discontinuous annular projection protruding inwardly from a periphery of said central plate-receiving part, said discontinuous annular projection overlying and retaining said clamping disk in said central plate-receiving part;

wherein said discontinuous annular projection is discontinuous at a plurality of circumferentially spaced apart locations so as to comprise a plurality of projection segments with circumferentially spaced apart gaps therebetween;

wherein an outer peripheral edge of said clamping plate is circumferentially continuous about an entirety of the outer periphery of said clamping plate;

wherein an entirety of said outer peripheral edge of said clamping plate lies in a single plane;

wherein an annular gap is formed between said periphery of said central plate-receiving part of said plastic disk and a periphery of said annular part of said clamping plate, such that said clamping plate is radially movably disposed in said central plate-receiving part;

wherein said circumferentially spaced apart gaps between said projection segments constitute means for viewing, along an axial direction, segments of said annular gap at circumferentially spaced apart locations thereof; and wherein, when said clamping plate is concentric with said plate-receiving part, said heat pressed and deformed portion of said plastic disk does not contact said clamping plate.

16. An optical disk as recited in claim 15, wherein said plastic disk further includes a main surface disposed outwardly of said central plate-receiving part;

said central plate-receiving part has a plate-receiving surface offset below said main surface of said plastic disk; and said clamping plate includes an outer peripheral portion which is interposed between said plate-receiving surface and said discontinuous annular projection.

17. An optical disk as recited in claim 16, wherein said gaps have a combined length which is greater than a difference in length between an outer circumference of said plate-receiving part and an inner circumference of said discontinuous annular projection.

18. An optical disk as recited in claim 15, wherein said discontinuous annular projection is discontinuous at four locations about said periphery of said central plate-receiving part.

19. An optical disk as recited in claim 15, wherein said gaps have a combined length which is greater than a difference in length between an outer circumference of said plate-receiving part and an inner circumference of said discontinuous annular projection.

20. An optical disk as recited in claim 15, wherein said discontinuous annular projection is present along substantially all of an outer circumferential periphery of said clamping plate.

* * * * *